United States Patent [19]
Ino et al.

[11] Patent Number: 5,766,440
[45] Date of Patent: Jun. 16, 1998

[54] METHOD FOR TREATING SLUDGE PRECIPITATED IN A PLATING BATH CONTAINING HALOID IONS

[75] Inventors: Takayuki Ino; Akifusa Ohnishi; Takao Shimizu, all of Tokyo, Japan

[73] Assignees: Kawasaki Steel Corporation; Nihon Parkerizing Co., Ltd., both of Japan

[21] Appl. No.: 604,089

[22] Filed: Feb. 20, 1996

[30] Foreign Application Priority Data

Aug. 28, 1995 [JP] Japan ......................... 7-218883
Oct. 12, 1995 [JP] Japan ......................... 7-264459

[51] Int. Cl.$^6$ ........................................ C25D 21/18
[52] U.S. Cl. ................... 205/99; 204/DIG. 13; 205/101; 210/710; 210/724; 210/904; 210/912
[58] Field of Search ............. 205/99, 101; 204/DIG. 13; 210/634, 638, 710, 724, 904, 912

[56] References Cited

U.S. PATENT DOCUMENTS

| | | | |
|---|---|---|---|
| 3,907,653 | 9/1975 | Horn | 204/94 |
| 4,006,213 | 2/1977 | Fisher et al. | 423/92 |
| 4,219,390 | 8/1980 | Stuart et al. | 204/54 R |
| 5,451,323 | 9/1995 | Akao et al. | 210/665 |
| 5,538,617 | 7/1996 | Steinbicker et al. | 205/302 |

FOREIGN PATENT DOCUMENTS

| | | |
|---|---|---|
| 57-70242 | 4/1982 | Japan . |
| 61-272393 | 12/1986 | Japan . |
| 61-276989 | 12/1986 | Japan . |
| 62-20893 | 1/1987 | Japan . |

*Primary Examiner*—Kathryn L. Gorgos
*Assistant Examiner*—William T. Leader
*Attorney, Agent, or Firm*—Austin R. Miller

[57] ABSTRACT

The present invention is to provide a method for treating sludge as a by-product of a process of tin electroplating a steel plate by means of a plating bath containing haloid ions, together with an equipment therefor. More specifically, by immersing the sludge in water prior to filtration, the residual sludge is subjected to alkali hydrolysis in the presence or absence of the ions of an alkali earth metal within a temperature range of 100° to 400° C., whereby cyanide compounds and fluoride compounds contained therein under environmental regulations are prepared into environmentally non-hazardous matters. By adjusting the filtrate to pH 7.5 to 10, the precipitate with the principal component of tin hydroxide is deposited to recover the tin components contained in the sludge. Furthermore, the recovered tin is refined into the metal tin, for recycling and use as the electrode by the plating.

20 Claims, 11 Drawing Sheets

METHOD FOR TREATING SLUDGE PRECIPITATED IN A PLATING BATH CONTAINING HALOID IONS

BACKGROUND OF THE INVENTION

The present invention relates to a method for treating sludge as a by-product of a process of producing an electroplated steel plate using an acidic plating bath containing haloid ions. More specifically, the present invention relates to a technique for modifying hazardous substances contained in the sludge into environmentally non-hazardous matters as well as efficiently recovering tin as a metal with valences at a high purity. Furthermore, the present invention relates to a technique for recycling recovered tin for use as an electroplating electrode for plating baths and the like.

One of the processes for continuously producing tin electroplated steel plate (tin plate), is the haloid process of electrodepositing the metal tin on the surface of a steel band, comprising electrolysis in an electrolytic solution containing ions of a so-called haloid element ($Cl^-$, $F^-$, etc.) from stannous chloride, sodium chloride, sodium fluoride, sodium hydrofluoride, and the like to be added to the solution, by using the steel band as the cathode and the metal tin as the anode.

According to the process, because the plating bath containing haloid ions to be used is acidic, the metal tin as the anode is solubilized through the reaction $Sn^0 \rightarrow Sn^{2+}$ into the plating bath containing haloid ions, to be then consumed as the plating metal. However, as steel plates or steel bands (the two types of steels are simply referred to as "steel plates" in the present specification) should be continuously treated in conventional, routine plating lines, oxidizing reactions may proceed due to oxygen incorporation into the plating bath and the like. More specifically, not only normal oxygen consumption as described above but also the reaction of $Sn^{2+} \rightarrow Sn^{4+}$ may be facilitated as well. The resulting $Sn^{4+}$ reacts with the coexisting ions in the plating bath, to generate by-products including tin salts such as sodium stannic hexafluoride ($Na_2SnF_6$), disadvantageously, which are precipitated as sludge of a vast amount.

Alternatively, divalent $Fe^{2+}$ ions solubilized into the plating bath containing haloid ions are partially oxidized into $Fe^{3+}$ ions during the acid washing process of preliminarily treating steel bands and during the electrolysis in a plating tank. Because the $Fe^{3+}$ ions serve as an oxidation promoting agent for the $Sn^{2+}$, the $Fe^{2+}$ ions help the generation of by-product sodium stannic hexafluoride ($Na_2SnF_6$). Additionally, the $Fe^{+3}$ ions precipitate in the form of sodium ferric hexafluoride ($Na_3FeF_6$).

For the purpose of suppressing the oxidation promoting action and side reactions of the $Fe^{3+}$ ions, therefore, yellow prussiate of soda [$Na_4Fe(CN)_6$] is added to the plating bath. Because the yellow prussiate of soda acts as a chelating agent of $Fe^{3+}$ ions and occasionally as a chelating agent of $Fe^{2+}$ ions, useless consumption of tin can be suppressed to some extent. However, the cheated materials eventually contaminate as slightly-soluble ferric ferrocyanide ($Fe_4[Fe(CN)_6]_3$) into the sludge.

By the haloid process, therefore, a vast amount of sludge (referred to as "raw sludge") is generated, in the plating bath containing haloid ions, as a by-product principally containing the sodium stannic hexafluoride, sodium ferric hexafluoride, and ferric ferrocyanide. The increase of the raw sludge is disadvantageous for the operation. Thus, electroplating lines should be periodically stopped so as to draw out the raw sludge accumulated in the lines.

Additionally, the haloid process is carried out with circulation of the electrolytic solution between an electrolytic cell (referred to as "plater" hereinbelow) and a so-called circulation tank, wherein air is incorporated in the circulating electrolytic solution disadvantageously, as has been described above, to promote the oxidation of $Sn^{2+}$ and deposit the raw sludge in the circulating tube, leading to poor circulation of the electrolytic solution. Thus, the control of the plated deposit is deteriorated. Simultaneously, the haloid process is disadvantageous in that deposition occurs on the steel band as the cathode and on the resistant roller, damaging the quality of resulting tin electroplated steels.

Additionally, the sludge-removal work after stopping the plating lines is "dirty work" requiring workers to touch the dark blue ferrocyanide and to wear heavy equipment such as masks, earplugs, gloves and the like to protect themselves from hazardous substances. Thus, such work is not preferable in the respect of working environment; in some cases, the disposal of such sludge from the haloid process is under regulations as industrial waste.

On the other hand, the recovered raw sludge contains compounds of tin. Therefore, tin is preferably recovered from the sludge if it is economically reasonable, in view of the cost, to do so. Thus, the sludge contained in a given container has been treated, at some cost, by companies refining non-ferrous metals. Conventionally, the method for recovering the metal tin has been practiced in general by the dry process as shown in FIG. 9, and by the wet process as shown in FIG. 10.

However, the dry process is disadvantageous in that hazardous substances contained in raw sludge may vaporize; alternatively, the wet process is problematic in that the process is very complex involving costly equipment.

Thus, Japanese Patent Laid-open No. Sho 57-70242 describes the improvement of such process by simplifying the procedures up to the electrolysis as shown in FIG. 11. More specifically, the Japanese Patent Laid-open discloses a technical method comprising preparing raw sludge into slurry and then treating the slurry with NaOH to recover an aqueous solution of useful tin ions while iron is separated and precipitated as iron hydroxide.

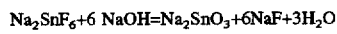

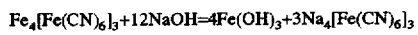

According to the method, the processes are simplified and the metal tin can be recovered as well. However, the recovering means of itself depends on an electrolytic reaction requiring high equipment cost, and it cannot be concluded yet that the method is economical. Furthermore, sodium stannic hexafluoride is decomposed to sodium fluoride at most. However, the cyanide compounds, under strict regulations from environmental concerns, still retain cyanide groups even in the form of the compounds, so that cyanide groups are contained or accumulated in the liquid waste of the electrolytic reaction solution, involving concerns of potential leakage.

As has been described above, no development has been made yet of a method for treating sludge to decompose the cyanide groups in the sludge, advantageously from an economical standpoint. Thus, the development of such method has been desired eagerly.

Additionally, the fluoride compounds in the sludge can be decomposed to sodium fluoride at most, but sodium fluoride of itself should be regulated environmentally, or a method provided for treating sludge to possibly convert sodium fluoride into a safer substance.

Alternatively, as to the tin recovery, the refinery cost of recovered tin exceeds the value of the recovered tin, which is economically disadvantageous. From another point of view, a variety of methods for decreasing sludge generation have been proposed (see Japanese Patent Laid-Open No. Sho 61-276989, Japanese Patent Laid-open No. Sho 61-272393, and Japanese Patent Laid-open No. Sho 62-20893), but these proposed methods cannot essentially decrease sludge generation to zero.

SUMMARY OF THE INVENTION

In such circumstances, it is an objective of the present invention to provide a method for treating sludge generated by the haloid process. In other words, firstly, the present invention is effective to completely decompose the cyanide groups in the cyanide compounds contained in raw sludge, which compounds are environmentally hazardous industrial waste; secondly, the present invention is effective to convert the fluoride compounds in the raw sludge into environmentally safer, non-polluting compounds; thirdly, the present invention is effective to economically recover tin at a high purity; and in a fourth place, the present invention is effective to recycle the recovered tin for use as electroplating electrodes.

The present inventors have made intensive investigations so as to attain the objectives. Thus, the inventors have successfully achieved that by immersing raw sludge in water at pH 7 or less prior to filtration, the sludge with the principal components comprising sodium ferric hexafluoride and ferric ferrocyanide (the sludge being referred to as "blue sludge" hereinafter) is filtered off as the residue while compounds including the principal component of the sodium stannic hexafluoride are transferred into the filtrate. In other words, the inventors have successfully achieved the efficient separation of raw sludge into an iron-containing fraction and a tin-containing fraction.

The inventors have found that by subsequently subjecting the blue sludge to alkali hydrolysis at a temperature higher than the boiling point of water, i.e. 100° C., the cyanide group of ferric ferrocyanide can be decomposed into formate and ammonia. The inventors have made successful attempts to totally convert the fluoride in the solution to be treated into alkali fluoride by simultaneously decomposing sodium ferric hexafluoride. Furthermore, the inventors have found that by treating the alkali fluoride generated from such decomposition with the ions of an alkali earth metal, the alkali fluoride can be converted into the fluoride of the alkali earth metal, which is safer from the viewpoint of environmental health.

Still further, by adding an inorganic alkali to the filtrate containing sodium stannic hexafluoride after the separation of the blue sludge, the inventors have achieved success in depositing a precipitate principally containing tin hydroxide (the precipitate being referred to as "white sludge" hereinafter). The inventors have developed the processes into a process of recovering tin. The present invention has been based on the combination of these findings.

A first aspect of the present invention is a method for treating sludge, comprising immersing into water at pH 7 or less, sludge (raw sludge) produced as a by-product of a process of tin electroplating steel plates by means of a plating bath containing haloid ($F^-$ or $Cl^-$) ions, a process of separating the sludge (blue sludge) remaining after the immersion, and a process of subjecting the residual sludge to alkali hydrolysis within a temperature range of 100° to 400° C. According to the first aspect of the present invention, the cyanide group in the sludge can be decomposed into formate and ammonia, which are environmentally not hazardous. Such decomposition has never before been attained conventionally.

Further, a second aspect of the present invention is a method for treating sludge in combination with the first aspect of the present invention, comprising adding ions of an alkali earth metal into the sludge during at least one of the processes prior to, during or after the alkali hydrolysis. According to the second aspect of the present invention, not only does the cyanide group in the sludge become decomposed but also the fluoride compounds in the sludge are converted into safer alkali earth metal fluorides, which are environmentally acceptable.

Furthermore, a third aspect of the present invention includes a method for treating sludge in combination with the second aspect of the present invention, wherein the alkali earth metal is at least one ion selected from the group consisting of calcium and magnesium.

Still further, a fourth aspect of the present invention is a method for treating sludge in combination with the second aspect of the present invention, wherein ions of an alkali earth metal are generated from at least one compound selected from the group consisting of calcium chloride, calcium oxide, calcium carbonate, calcium hydroxide, magnesium chloride, magnesium oxide, magnesium carbonate and magnesium hydroxide.

Furthermore, a fifth aspect of the present invention is a method for treating sludge in combination with the first or second aspect of the present invention, comprising preparing the residual sludge into a solution having a pH of 9.5 or more, and subjecting the solution to hydrolysis.

Still furthermore, a sixth aspect of the present invention is a method for treating sludge in combination with the first or second aspects of the present invention, wherein an oxidant is contained in the solution for the immersing process.

Additionally, a seventh aspect of the present invention is a method wherein the oxidant is aqueous hydrogen peroxide.

Still furthermore, an eighth aspect of the present invention is a method for treating sludge, comprising immersing into water at pH 5.5 to 6 sludge as a by-product of a process of tin electroplating a steel plate by means of a plating bath containing haloid ions, a first separation process of separating the sludge (blue sludge) remaining after the immersion, subjecting the residual sludge from the first separation process to alkali hydrolysis within a temperature range of 100° to 400° C., and adjusting the separated solution from the first separation process to pH 7.5 to 10, and separating the precipitate principally containing tin hydroxide deposited through pH adjustment. According to the eighth aspect of the present invention, the cyanide group in the sludge can be decomposed into formate and ammonia, whereby the cyanide group can be converted into environmentally non-polluting substances, as conventionally never before achieved, together with the separation and recovery of tin in the form of tin hydroxide, from the sludge.

Further, a ninth aspect of the present invention is a method for treating sludge in combination with the eighth aspect of the present invention, comprising adding the ions of an alkali earth metal to the sludge during at least one of the processes prior to, during and after alkali hydrolysis. According to the ninth aspect of the present invention, not only the cyanide group in the sludge can be decomposed but also the fluoride compounds in the sludge can be converted into safer alkali earth metal fluorides, which are environmentally not polluting. Simultaneously, the tin in the sludge can be separated and recovered as tin hydroxide.

Furthermore, in a tenth aspect of the present invention the ions of an alkali earth metal are at least one ion selected from the group consisting of calcium ion and magnesium ion.

Still further, an eleventh aspect of the present invention is a method for treating sludge in combination with the ninth aspect of the present invention, wherein the ions of an alkali earth metal are generated from at least one compound selected from the group consisting of calcium chloride, calcium oxide, calcium carbonate, calcium hydroxide, magnesium chloride, magnesium oxide, magnesium carbonate and magnesium hydroxide.

Furthermore, a twelfth aspect of the present invention is a method for treating sludge in combination with the eighth or ninth aspect of the present invention, comprising preparing the residual sludge into a solution of pH 9.5 or more and subjecting the solution containing the residual sludge to hydrolysis.

Still furthermore, a thirteenth aspect of the present invention is a method for treating sludge in combination with the eighth or ninth aspect of the present invention, comprising dehydrating the precipitate principally containing tin hydroxide from the second separation and reducing the tin oxide recovered from the dehydration into the metal tin.

Further, a fourteenth aspect of the present invention is a method for treating sludge in combination with the eighth or ninth aspect of the present invention, comprising concentrating the separated solution from the second separation and transferring the resulting solution back into the plating bath containing haloid ions.

Still further, a fifteenth aspect of the present invention is a method for treating sludge in combination with the eighth or ninth aspect of the present invention, wherein an oxidant is added to at least one of the solution of the immersing process and/or the separated solution from the first separation process.

Additionally, in a sixteenth aspect of the present invention the oxidant is aqueous hydrogen peroxide.

Additionally furthermore, a seventeenth aspect of the present invention is a method for treating sludge, comprising a process of immersing into acidic water sludge as a by-product of a process of tin electroplating a steel plate by means of a plating bath containing haloid ions, separating the sludge remaining after the immersion, adjusting the separated solution from the first separation to pH 7.5 to 10, and separating the precipitate principally containing tin hydroxide deposited through pH adjustment, wherein an oxidant is added to at least one of the solution of the immersing process and/or the first separated solution, and the solution of the immersing process is adjusted to pH 5.5 to 6. The seventeenth aspect of the present invention can attain efficient separation and recovery of tin in the form of high-purity tin hydroxide, from the sludge, by controlling the pH of the immersion process within a specific range.

Additionally, in an eighteen aspect of the present invention the oxidant is aqueous hydrogen peroxide.

Furthermore, a nineteenth aspect of the present invention is a method for treating sludge in combination with the seventeenth or eighteenth aspect of the present invention, comprising dehydrating the precipitate principally containing tin hydroxide from the second separation and reducing the tin oxide from the dehydration into the metal tin.

Still furthermore, a twentieth aspect of the present invention is a method for treating sludge in combination with the seventeenth or eighteenth aspect of the present invention, comprising concentrating the separated solution from the second separation process and subsequently transferring the solution back into the plating bath containing haloid ions.

Additionally, the present inventors have made equipment for carrying out the method described above.

More specifically, in a twenty-first aspect of the present invention sludge treating equipment is provided for decomposing hazardous cyanide compounds of iron as well as fluoride compounds of iron, comprising a water immersion tank for sludge produced by tin electroplating a steel plate in a plating bath containing haloid ions, a first separation means of the residual sludge from the immersing process, and a pressure-resistant reactor for hydrolyzing the residual sludge.

Further, in a twenty-second aspect of the present invention sludge treating equipment is provided with a tin hydroxide recovery system, comprising a pH adjusting tank for receiving the separated solution from the first separation means for preparing the solution into an alkaline solution, and a second separation means of the precipitate deposited in the pH adjusting tank. Still furthermore, in twenty-third aspect of the present invention the sludge treating equipment, comprises a drying means for dehydrating the tin hydroxide from the second separation means for preparing tin oxide and a reduction system is provided for converting the tin oxide into the metal tin, wherein the tin hydroxide is regenerated into the metal tin for recycling the metal tin for use as tin plating electrodes and the like.

As has been described above, the present invention has successfully achieved the recovery of tin hydroxide and the metal tin from raw sludge as a by-product of a tin electroplating line by means of an acidic plating bath containing haloid ions, while cyanide and fluoride can be modified into environmentally non-polluting substances. It is estimated that the worldwide generation of raw sludge from such plating lines is about 2,000 tons or more in total, yearly. Hence, the plating industries have been very much concerned with sludge disposal, all over the world. By providing a new process line employing the method of the present invention, an effect reasonably consistent with the investment cost can be expected with respect to pollution control and/or energy saving.

The advantages of the present invention will now be described specifically hereinbelow.

1. Because the secondary resource to be used is for example, calcium chloride, calcium hydroxide, magnesium chloride, water, hydrogen peroxide, sodium hydroxide, sulfuric acid, hydrochloric acid or the like, the cost for treating with such materials is low.

2. An autoclave for carrying out alkali hydrolysis may be made of standard steel satisfactorily, and is not necessarily a costly heat-resistant material or a corrosion-resistant material.

3. The alkali hydrolysis of blue sludge causes reduced trouble, with simpler maintenance of the system.

4. White sludge can be calcined and dried and converted into tin oxide, which can be sold as a resource containing tin to collieries, or the metal used to recover tin for direct use in tin plating.

5. The filtrate after alkali hydrolysis does not contain cyanide, so that the filtrate can be discharged as it is, if no COD regulation is enforced onto the liquid waste.

6. The waste is converted into a lesser amount of non-hazardous substances. As an example, when raw sludge (100 kg) is subjected to a series of the aforementioned processes and the final solution from the white sludge process is recycled to the plating process, the industrial waste with the principal component of calcium fluoride amounts to 52.6 kg, while the non-hazardous filtrate amounts to 285.7 kg as waste. When the filtrate is recycled into the first reaction tank, the non-hazardous industrial waste (52.6 kg) principally containing calcium fluoride is the only discharge from the treating equipment.

7. When the filtrate after alkali hydrolysis is subjected to a microbial treatment, the BOD of the treated solution is so greatly lowered that the solution can be discharged as it is or the solution can be recycled as a water source for use in tin plating or any one of the processes of the present invention.

Furthermore, in accordance with the present invention, because the raw sludge can be separated and removed from the electrolytic solution in circulation in the plating system, a normal plating solution comprising $Sn^{2+}$ with no sludge can be transferred back to the plating bath (plater).

By arranging the equipment for treating sludge in accordance with the present invention near the tin plating system, not only the hazardous substances in the separated raw sludge can be treated but also the metal tin can be recovered and recycled, so that the tin can be recycled effectively without drawing the tin out of the tin plating system battery.

Consequently, cleaning of the back electrolytic solution which is to be circulated can be attained, whereby the amount of raw sludge in the plating bath can be decreased together with reduction of trouble relating to quality. Simultaneously, hazardous substances (cyanide compounds) having been drawing serious concerns about their disposal as well as substances under environmental regulations (fluoride compounds) can be readily and economically treated. Additionally, the working environment therefor can be improved.

DETAILED DESCRIPTION OF THE PREFERRED EMBODIMENTS

Figure 1:
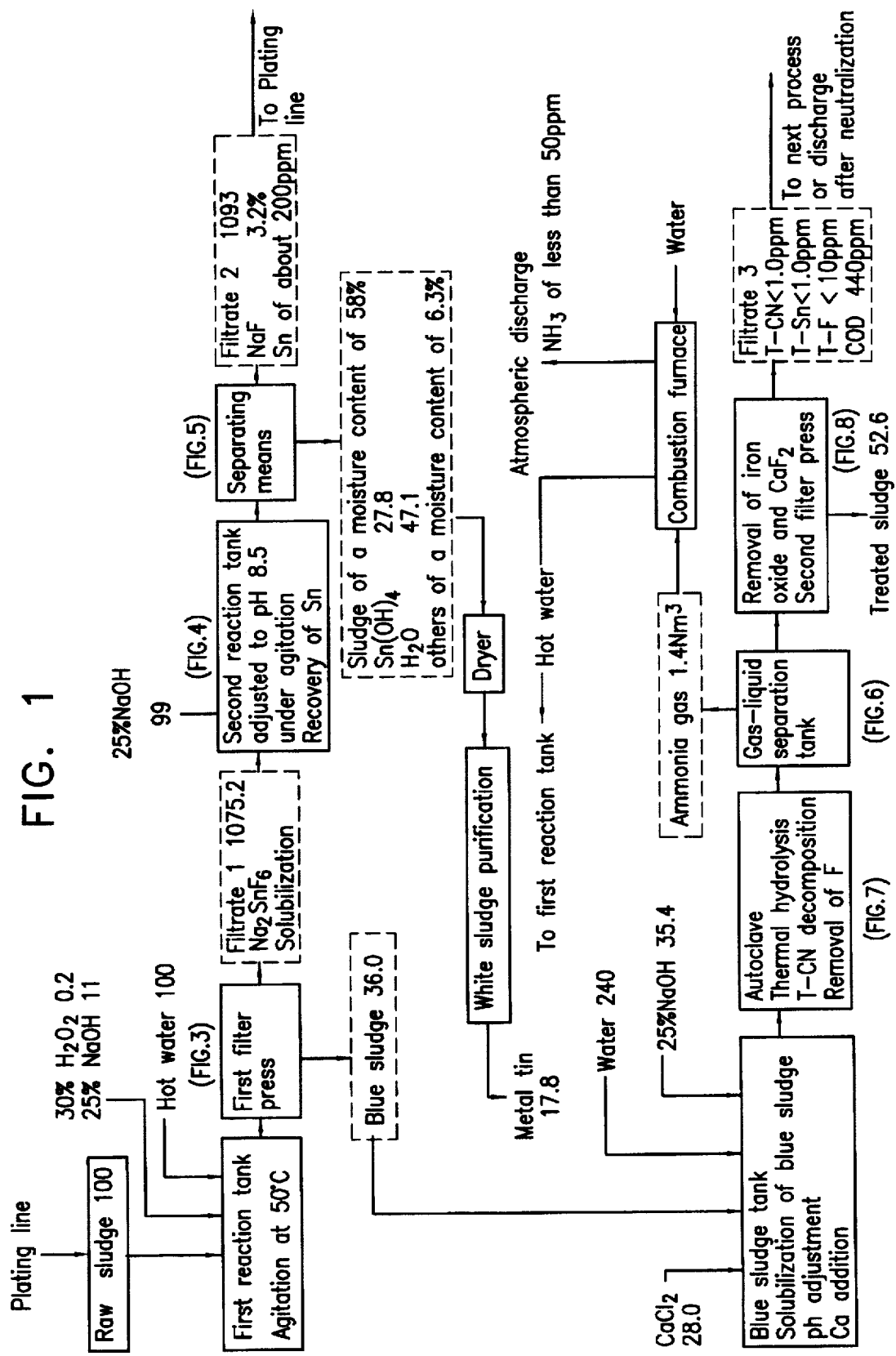
FIG. 1 is a flow chart depicting the processes of treating sludge in accordance with the present invention.

The first aspect of the present invention for alkali hydrolysis of blue sludge oxidizes tin, filters blue sludge out, and subjects the blue sludge to alkali hydrolysis of Fe compounds.

It first comprises immersing raw sludge recovered from a plating bath containing haloid ions, in water at pH 7 or less. The process corresponds to a process step of extracting soluble sodium stannic hexafluoride, and therefore, the immersion may be carried out while leaving the sludge as it is, but preferably under agitation. Furthermore, the temperature for such immersion is under no specific limitation; however, the immersion is preferably carried out under heating. More preferably, the immersion is carried out at 40° to 70° C., and most preferably, at 40° to 60° C. For the immersion, furthermore, water is used in an amount to attain extraction satisfactorily, with no specific limitation, but the amount varies depending on the immersion temperature and sludge composition. Preferably, for the usual sludge composition at an immersing temperature of 50° to 70° C., the amount of water should be about 5- to 20-fold that of the sludge; more preferably, the amount of water should be 5- to 15-fold that of the sludge. Furthermore, the immersing solution should be at pH 7 or less. This is because tin compounds precipitate under basic conditions; more preferably, the solution should be at pH 4 to 6.

In accordance with the present invention, pH adjustment may be necessary, which is not limited to the first process; in such case, unless otherwise stated, use may be made of an inorganic alkali including alkali hydroxides such as sodium hydroxide and calcium hydroxide, or alkali earth metal hydroxides such as calcium hydroxide and magnesium hydroxide as the base; and as the acid, use may be made of inorganic acids such as sulfuric acid and hydrochloric acid.

The pH of the immersing water varies depending on the nature of the subsequent blue sludge treatment or tin recovery, but in accordance with the first aspect of the present invention, tin recovery is not the immediate goal. Additionally, it is indicated that even if the blue sludge contains a considerable amount of tin compounds, the alkali hydrolysis reaction can be prevented. Therefore, the water immersion can be carried out in a basic condition, which is nevertheless not practical.

Preferably, the immersion process may be carried out in the presence of an oxidant. This is because divalent iron ions and divalent tin ions are deposited and contaminated into a plating solution during the recovery of raw sludge from the plating solution, so that these ions are accordingly oxidized to adjust the sludge components. Such oxidants include those having oxidizing actions in an aqueous system at pH 7 or less, with no specific limitation; for example, preferably, use may be made of hydrogen peroxide, ozone, an alkaline hypochlorite and the like; among them, aqueous hydrogen peroxide is preferable in view of ease of handling.

Furthermore, a stoichiometric excess of the oxidant should be added to these divalent ions. The present inventors have found by monitoring the divalent iron ions in the raw sludge, that the oxidant should be used preferably at a 0.01- to 4-fold equivalent weight, more preferably at a 0.3- to 0.5-fold equivalent weight that of the equivalent weight of the divalent iron ions.

Subsequently, at the second (filtration) process, the residual sludge (namely, blue sludge) from the immersion process should be separated from the immersing solution. As the separation means, use may be made of any separation means applicable to the separation of slurry. For example, use may be made of filtering separation, centrifuging, separation by standing alone, and slanting separation, but filtering separation is preferable. The method for separating the blue sludge from the raw sludge is described and illustrated in detail hereinbelow.

The principal iron-containing components of blue sludge comprise $Na_3FeF_6$ (sodium ferric hexafluoride) and $Fe_4[Fe(CN)_6]_3$ (ferric ferrocyanide), and the remaining components are water and lesser amounts of fluoride compounds and tin compounds. When no oxidant is used in the water immersing process, $Fe_2[Fe(CN)_6]$ may be present. Generally, the blue sludge prior to drying may frequently contain 30 to 60% of $Na_3FeF_6$ and 5 to 15% of $Fe_4[Fe(CN)_6]_3$. The "percentage" described in the Specification means "% by weight" unless otherwise stated.

Subsequently, at the third process (alkali hydrolysis), the blue sludge recovered by separation (filtration) is subjected to alkali hydrolysis within a temperature range of 100° to 400° C.

The alkali hydrolysis of iron components is preferably carried out in a region of alkalinity for reaction efficiency. Thus, the hydrolysis is carried out under an alkaline pH, but because hydrofluoric acid temporarily generated during the alkali hydrolysis corrodes the reactor, the hydrolysis is preferably carried out at pH 9.5 or more.

The alkali hydrolysis by means of sodium hydroxide is illustrated hereinbelow. The alkali hydrolysis of the compounds described above is as follows.

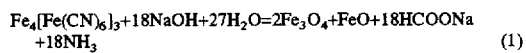

$$Fe_4[Fe(CN)_6]_3 + 18NaOH + 27H_2O = 2Fe_3O_4 + FeO + 18HCOONa + 18NH_3 \quad (1)$$

$$Fe_2[Fe(CN)_6] + 6NaOH + 9H_2O = 3FeO + 6HCOONa + 6NH_3 \quad (2)$$

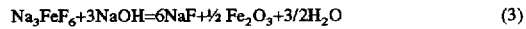

$$Na_3FeF_6 + 3NaOH = 6NaF + \tfrac{1}{2}Fe_2O_3 + 3/2H_2O \quad (3)$$

It is believed that the reactions of the formulae (1) and (3) are the main reactions. When an oxidant is used at the water immersing process, the reaction of the formula (2) substantially does not occur.

In accordance with the present invention, the alkali hydrolysis is carried out at 100° C. or more to 400° C. or less. The reaction proceeds at less than 100° C., but the reaction rate is slow. Thus, 100° C. is the lower limit. When the temperature is more than 400° C., the equipment cost is escalated, disadvantageously. Furthermore, the reaction is preferably carried out in a system under pressure within a temperature range of 100° C. or more and 400° C. or less, more preferably a temperature range of 130° C. to 300° C. When the hydrolysis was carried out at 130° C. to 250° C. using an autoclave, for example, the reaction pressure was about 2 to 41 kg/cm².

As has been described above, cyanide is beneficially decomposed into sodium formate and ammonia, which are environmentally non-polluting substances. 80% of the generated ammonia is gaseous, and the remaining ammonia of less than 20% is dissolved in the solution after thermal hydrolysis. Furthermore, the alkali hydrolysis consequently generates fresh precipitates such as $Fe_2O_3$, FeO, and $Fe_3O_4$, while the reaction solution contains HCOONa, $NH_3$, NaF and the like. Thus, if a separation means such as filtration is used at this stage, only the fraction containing iron can be separated and isolated. In the present specification, the term "cyanide" means either or both of cyanide ions and cyanide-complex ions.

The second aspect of the present invention will now be described mainly hereinafter.

The second aspect of the present invention comprises reacting soluble fluorides to form insoluble fluorides by adding the ions of an alkali earth metal during at least one of the processes prior to, during and after the foregoing alkali hydrolysis step of the first aspect of the present invention.

More specifically, the second aspect of the present invention is to convert environmentally unpreferable sodium fluoride into less toxic fluorides of an alkali earth metal, the sodium fluoride being contained in the reaction solution as the outcome of the hydrolysis of the first aspect of the present invention.

Then, the conversion reaction is illustrated, as "$CaCl_2$ 28.0" in FIG. 1 of the drawings, using calcium chloride as a calcium ion source.

$$CaCl_2 + 2NaF = CaF_2 + 2NaCl \quad (4)$$

As such alkali earth metal ion, use may be made of calcium ion and magnesium ion, preferably, from the respect of the reaction efficiency. Calcium ion is more preferable from the economical point of view.

As such ion source of the alkali earth metal ion, use may be made of at least one compound selected from the group consisting of calcium chloride, calcium oxide, calcium carbonate, calcium hydroxide, magnesium chloride, magnesium oxide, magnesium carbonate and magnesium hydroxide.

Preferably, the alkali earth metal ion should be added at 0.5-fold mole or more to that of the fluoride in the remaining sludge (blue sludge).

Still furthermore, the process of adding the alkali earth metal ion may be carried out at any stage prior to, during or after the alkali hydrolysis. Because the alkali hydrolysis (formula 3) and the reaction (formula 4) can be carried out successively, however, it is preferable that the alkali earth metal ion may be coexistent in the reaction system of the hydrolysis. More specifically, by depositing alkali earth fluorides from the reaction solution, the phase equilibrium of the solution-precipitate system advantageously influences on the generation side of the alkali hydrolysis (formula 3). Therefore, these ions may preferably be added during at least one of the processes during and prior to the hydrolysis process. If the alkali hydrolysis is carried out in a pressure-resistant reactor for continuous operation, these ions may preferably be added at the process of pH adjustment prior to the alkali hydrolysis process.

If alkali earth metal hydroxides such as calcium hydroxide and magnesium hydroxide are used as such alkali earth metal ion sources, preferably, the hydroxides also serve as basic compounds such as alkaline hydroxides, for pH adjustment prior to the alkali hydrolysis. It is needless to say that the hydroxides may also be used in combination with alkali hydroxides.

Because the ammonia gas described above can be burned at a temperature of 900° C. or less, preferably 800° C. or less by the following formula, with no generation of NOx, the gas can be used as a heat source at any of the processes of the present invention.

$$4NH_3 + 3O_2 = 2N_2 + 6H_2O \quad (5)$$

Additionally, the filtrate containing ammonia and formate, recovered by filtering off the compounds generated freshly through the thermal hydrolysis from the treated solution, can be converted into environmentally non-polluting substances by treatment with an aerobic or anaerobic microorganism. Firstly, ammonia is modified into nitrate-type nitrogen by aerobic microbial treatment, and then, nitrate-type nitrogen can be anaerobically treated microbiologically in the presence of a hydrogen donor or methanol, to be degraded finally into nitrogen and water. Formate can be decomposed by a known aerobic microbial treatment. However, the formate is slightly decomposable due to the higher ammonia concentration of 0.1 to 0.5 g/liter in the filtrate. Therefore, a bacterium, namely the blue sludge, may be incubated by the microbial incubation method, described in "The Tuftride liquid waste disposal by facultative anaerobic bacteria", Nippon Parker Rising Technical Journal, 1989, No. 2, pp. 20–88, particularly pp. 21, left column, last line to right column, line 5 by one of the applicants; in such case, the blue sludge is preferably treated, in a non-diluted solution of sludge generated after the thermal hydrolysis, by an aerobic microbial treatment using a facultative anaerobic bacterium collected by incubating sludge and the like from sewage disposal plants. It is estimated that the BOD of the filtrate after the microbial treatment can be lowered to 25 ppm or less by the treatment.

The foregoing disclosures are conveniently referred to as the first to seventh aspects of the present invention, mainly the first aspect.

The eighth aspect of the present invention relates to tin recovery, and more particularly to a method for treating raw sludge and comprises a process of recovering tin in addition to treating blue sludge. Hence, the explanations heretofore are also applicable therein.

The eighth aspect of the present invention is a method for recovering tin while otherwise treating sludge, comprising a process of immersing into water at pH 5.5 to 6 sludge provided as a by-product of tin electroplating a steel plate by means of a plating bath containing haloid ions, separating the sludge remaining after the immersion, subjecting the residual sludge from the first separation process to alkali hydrolysis within the aforementioned temperature range of 100° to 400° C., adjusting the separated solution from the first separation to pH 7.5 to 10, and separating the resulting precipitate principally containing tin hydroxide.

The conditions for water immersion of raw sludge at the first process should be at pH 5.5 to 6, which is a narrowed pH range compared with the pH range previously described herein in regard to the first aspect of the present invention. This is because the tin containing fraction (with the principal component of $Na_2SnF_6$) in the raw sludge can be more readily transferred at pH 5.5–6 into a separate solution while retaining more of the iron components in the blue sludge solid phase. Other processes including the immersing process, the first separation process, the alkali hydrolysis process of blue sludge, the addition of the ions of an alkali earth metal and the addition of oxidants are the same as heretofore explained for the first to seventh aspects of the present invention.

So as to recover tin, the separated solution from the first separation process is alkalinized to pH 7.5 to 10, as heretofore discussed to deposit a tin-containing precipitate (referred to as "white sludge") with the principal component comprising tin hydroxide. If the pH is too high, redissolution of the precipitate occurs because tin is an amphoteric element, leading to a decrease of tin recovery. Thus, the pH upper limit should be 10.

The reaction formula using sodium hydroxide as an alkalizing agent is illustrated below.

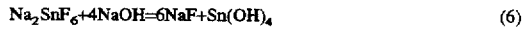

$$Na_2SnF_6 + 4NaOH = 6NaF + Sn(OH)_4 \qquad (6)$$

Subsequently, the precipitate with the principal component of tin hydroxide as the deposit is separated and recovered from the alkali solution. As the second separation means then, the same type filter press as the first separation means can be used. These have been explained in the section relating to the first aspect of the present invention.

It is proposed to perform dehydrating and drying of the $Sn(OH)_4$ precipitate with the principal component of tin hydroxide thus separated and recovered, to convert the tin hydroxide into tin oxide, and subsequently reducing the tin oxide into the metal tin, as the thirteenth aspect of the present invention. The dehydration and drying means are preferably those suitable for such dehydration process, with no specific limitation; preferably, the means is a heating dryer of an agitation type which surface can be readily refreshed or of a kneader type. Also, the reducing means may satisfactorily be the one of a general tin refinery system.

Furthermore, the separated solution from the Sn precipitation contains sodium fluoride from the plating bath, and the NaF solution may be concentrated and transferred back into the plating bath. Such concentration may be continued until the solution is completely dried.

The separated solution may be disposed of after adding alkali earth metal ions to convert the sodium fluoride into a fluoride of an alkali earth metal.

The foregoing explanations are designated as referring mainly to the eighth to sixteenth aspects of the present invention, mainly about the eighth aspect of the present invention.

Explanation will now be made mainly about the seventeenth aspect of the present invention.

The seventeenth aspect of the present invention relates to recovering tin from raw sludge, further narrowing the process of recovering tin.

Firstly, water immersion of raw sludge recovered from the electrolytic solution is carried out, comprising dissolving sodium stannic hexafluoride contained in the raw sludge as an aqueous solution in the presence of an oxidant at pH 5.5 to 6, for separation from the other insoluble components. Then, the temperature of immersing water is preferably 40° to 70° C., more preferably 40° to 60° C. Water is then used at an amount of preferably 5 to 20 parts, more preferably 5 to 15 parts to that of the raw sludge.

Successively, the separated solution from the water immersion is adjusted to an alkaline pH, to deposit the precipitate of tin containing compounds (tin hydroxide), prior to separation. Then, some of the iron ions and fluoride ions contained in the separated solution are precipitated and separated along with the tin compounds. When the separated precipitate is solubilized to recover the metal tin by the known molten salt electrolysis method and the like, the precipitate of a higher iron content is not preferable for refinery because such precipitate cannot be applied for use in regeneration.

The seventeenth aspect of the present invention has been attained from such respect.

The present inventors have attempted to oxidize divalent iron compounds with the addition of an oxidant $H_2O_2$ transfer the compounds into blue sludge at the immersion process in warm water.

The table below shows the relation between the equivalent weight ratio of added $H_2O_2$ to the iron equivalent weight in the solution of the water immersing process, and the iron and tin concentrations (ppm) in the filtrate of water immersion [the concentration of iron ions (containing divalent and trivalent irons) prior to addition of $H_2O_2$; 225 ppm, the concentration of tin ions (containing divalent and tetravalent tin); 13990 ppm, at pH 6.0].

TABLE 1

| $H_2O_2$ Equivalent weight ratio | pH | Dissolved Fe | Dissolved Sn |
|---|---|---|---|
| 0 | 6 | 225 | 13990 |
| 0.01 | 6 | 35.3 | 13400 |

TABLE 1-continued

| H$_2$O$_2$ Equivalent weight ratio | pH | Dissolved Fe | Dissolved Sn |
|---|---|---|---|
| 0.1 | 6 | 25.4 | 13510 |
| 0.3 | 6 | 21.8 | 13530 |
| 0.5 | 6 | 20.0 | 13700 |
| 1 | 6 | 35.7 | 13950 |
| 2 | 6 | 34.7 | 13550 |
| 4 | 6 | 34.2 | 13300 |

Table 1 shows the decreased iron level in the separated solution of water immersion, which solution is to be converted to white sludge consequently, by oxidizing divalent iron into trivalent iron by the addition of H$_2$O$_2$ at an equivalent weight ratio of 0.01 or more. Via the oxidant contained in the solution containing raw sludge prior to water immersion, the iron in the solution is mixed into blue sludge; or via the oxidant contained in the filtrate from water immersion, iron is precipitated. Thus, the oxidant serves to decrease the iron level in the resulting tin-containing white sludge.

The seventeenth aspect of the present invention has been attained on the basis of the experimental results and discussion described above. More specifically, the seventeenth aspect is summarized as follows; raw sludge (pH 5.5 to 6; the reason for such limitation will be described hereinbelow) is water immersed in the presence of an oxidant, to oxidize divalent iron to trivalent iron to eventually decrease the iron concentration in the water immersing solution and to decrease the iron content in white sludge finally recovered. H$_2$O$_2$ exhibits such beneficial effects at an equivalent weight ratio of 0.1 to 4, preferably 0.3 to 0.5. Alternatively, other oxidants such as O$_3$ and NaClO may exhibit the same effect.

Table 2 below shows the relation between the iron concentration and tin concentration (ppm) in the filtrate of water immersion, recovered from the immersion of raw sludge (the iron concentration and tin concentration prior to the addition of H$_2$O$_2$ were 282 ppm and 15330 ppm, respectively) in warm water while changing the pH and fixing the ratio of the H$_2$O$_2$ equivalent weight to the iron equivalent weight at 0.5.

TABLE 2

| pH | Fe | Sn |
|---|---|---|
| 4.5 | 232 | 15330 |
| 5.0 | 191 | 15165 |
| 5.5 | 42.1 | 14640 |
| 5.7 | 26.3 | 14605 |
| 6.0 | 30.9 | 13558 |

Table 2 shows that the iron concentration in the filtrate of water immersion is the lowest at pH 5.5 to 6.0, particularly around pH 5.5 to 5.7, along with higher Sn concentrations.

Subsequently, explanation will follow about the experiments determining the conditions to precipitate tin oxide required for the seventeenth aspect of the present invention.

More specifically, by immersing raw sludge in warm water and changing the pH of the filtrate of water immersion (the iron concentration, tin concentration and fluoride concentration were 325 ppm, 17500 ppm and 18.5 g/L, respectively) while fixing the equivalent weight ratio of H$_2$O$_2$ added to the iron ion in the solution of the water immersing process, the contents of Fe, Sn and F in the filtrate (white sludge) were determined after separation of the precipitate from the water immersing solution. The results are shown in Table 3.

TABLE 3

| pH | Fe (ppm) | Sn (ppm) | F (g/L) |
|---|---|---|---|
| 5.7 | 24.6 | 15930 | 17.4 |
| 6.0 | 25.1 | 15430 | 17.2 |
| 6.5 | 9.3 | 14625 | 16.9 |
| 6.8 | 0 | 13125 | 16.7 |
| 7.0 | 0 | 11652 | 15.1 |
| 7.2 | 0 | 9600 | 15.2 |
| 7.5 | 0 | 6675 | 14.0 |
| 8.5 | 0 | 0.4 | 14.5 |
| 9.0 | 0 | 2455 | 14.8 |

As shown in Table 3, the pH to efficiently deposit tin hydroxide is around 7.5 to 10 (with no data at pH 10), preferably around 8.5 in particular. By applying such pH range, almost the total tin ions in the filtrate of water immersion can be recovered as white sludge. Because iron ions are almost entirely incorporated into the white sludge, however, it is indicated that the separation of the tin fraction from the iron fraction (blue sludge) in the raw sludge is very significant. Furthermore, fluoride is not specifically deleterious as long as the following process for recovering the metal tin is utilized.

The precipitate with the principal component of tin hydroxide, recovered by the precipitation and separation described above, is dehydrated and filtered by separation means such as paper filter, centrifuge and the like, to be prepared as so-called white sludge.

Subsequently, the white sludge is dried in a dryer, and tin hydroxide as the principal component thereof is dehydrated and modified into tin oxide.

$$Sn(OH)_4 = SnO_2 + 2H_2O \qquad (7)$$

As one example, the composition of the white sludge after drying is as follows; Sn; 60 to 70%, F; 5 to 15%, O; 15 to 20%, Na; 5 to 15%, and Fe; 1% or less.

The dry white sludge is reduced and melted, together with a carbonaceous reducing agent, for example graphite, in a pot-shape melting system, and is then purified into the metal tin by the reducing refining method to separate the tin from impurities such as the iron fraction on the basis of the difference in melting point. In such case, the resulting metal tin is at a purity of 99% or more. The purity may be 99.2% under preferable conditions for immersion. Thus, the tin in sludge can be recycled as an anode and as an electrode supporting pad for a process of tin electroplating, by concurrently equipping a casting equipment for immersing the metal tin in warm water to cast the tin as an anode plate.

The filtrate of water immersion described above contains mainly NaF at a concentration of 2 to 5%, so that the filtrate may be recycled to the process of tin electroplating; otherwise, the filtrate may be treated with the ions of an alkali earth metal, from calcium chloride for example, to modify the fluoride ion into the fluoride of the alkali earth metal as a non-hazardous substance for disposal.

Explanation has been made insofar of the seventeenth to twentieth aspects of the present invention, mainly the seventeenth aspect. Preferable conditions among them should be applicable to the inventive aspects of the sixteenth aspect and those preceding the aspect.

Then, explanation will be made of an inventive equipment to practice the method for treating sludge in accordance with the first to twentieth aspects of the present invention described above. Specifically, the twenty-first to twenty-third aspects of the present invention will now be illustrated in detail with reference to equipments and systems with relation to these aspects.

Figure 12:
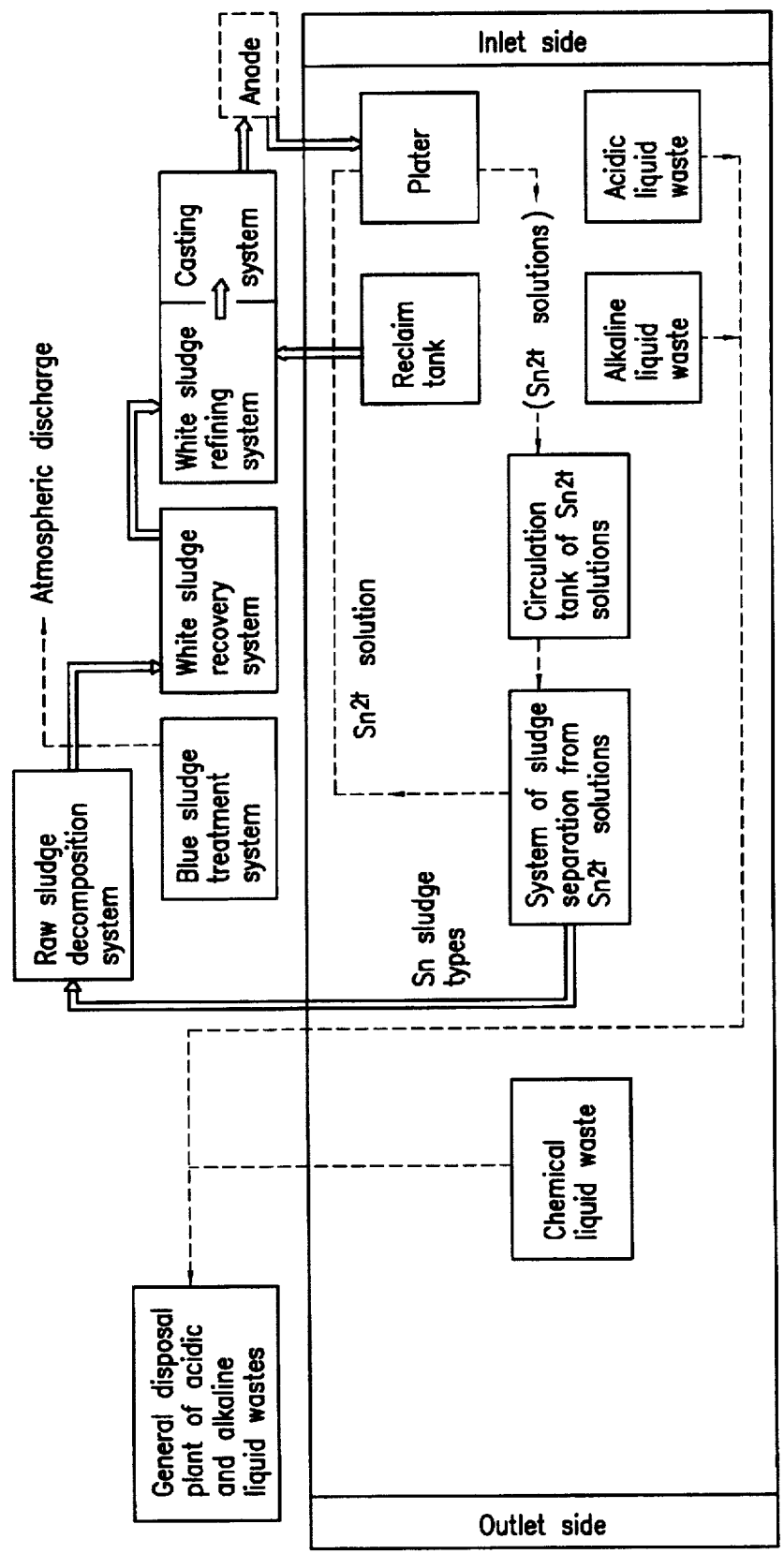
FIG. 12 is the whole view of a plating system by the haloid process.

With reference to FIG. 12, firstly, explanation will be made of the relation between a tin electroplating system using a plating bath containing haloid ions and an equipment for treating sludge.

More specifically, a circulation tank provided for circulating an electrolytic solution from a plater is a steel tank of a volume 100 m$^3$ capable of reserving a liquid volume of 40 m$^3$. The tank is divided into two layers, namely upper and bottom layers. The upper layer is a reservoir of a solution back from each plater, and by utilizing the slope from the upper layer, the back solution is forced to be back into a raw sludge separation system. Alternatively, nitrogen gas is sealed in the bottom layer for reserving the electrolytic solution cleaned and transferred back from the raw sludge separation system. So as to surely reserve the volume of the electrolytic solution required for plating, the raw sludge separation system contains a great number of filters in parallel arrangement for sufficient filtration ability. The residue after filtration, namely raw sludge, is dropped down from the filters onto a belt conveyor to be successively transferred back into the raw sludge decomposition system in accordance with the present invention.

For specific explanation, then, individual systems constructing the present invention are illustrated in FIGS. 1 to 8.

Figure 2:
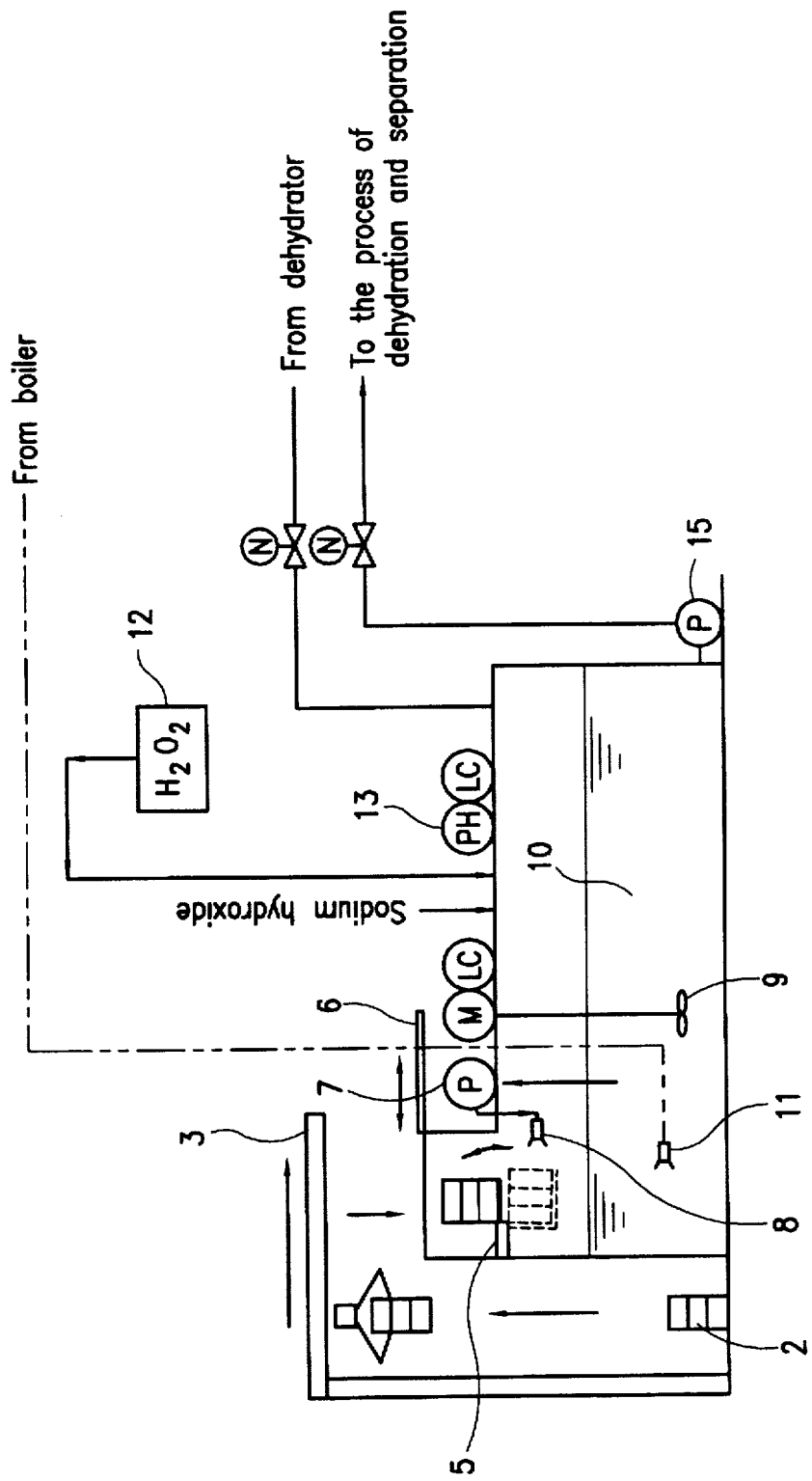
FIG. 2 is a view of equipment for the process of water immersing raw sludge.
Figure 3:
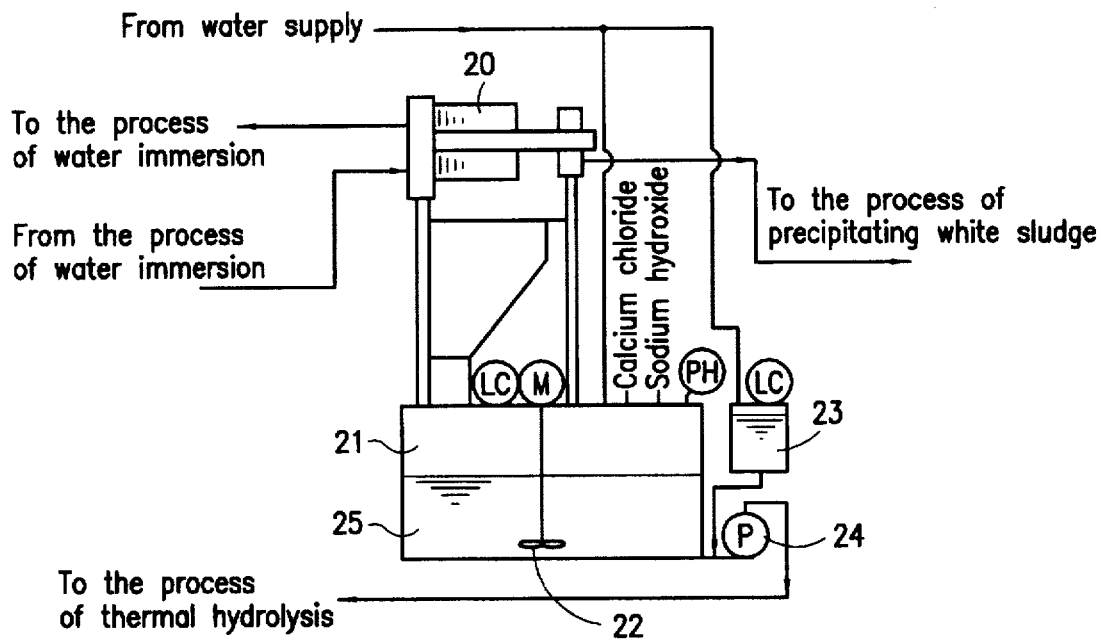
FIG. 3 is a view of equipment depicting a first filter press for separating a solution of sodium stannic hexafluoride and blue sludge from the solution for water immersion.
Figure 4:
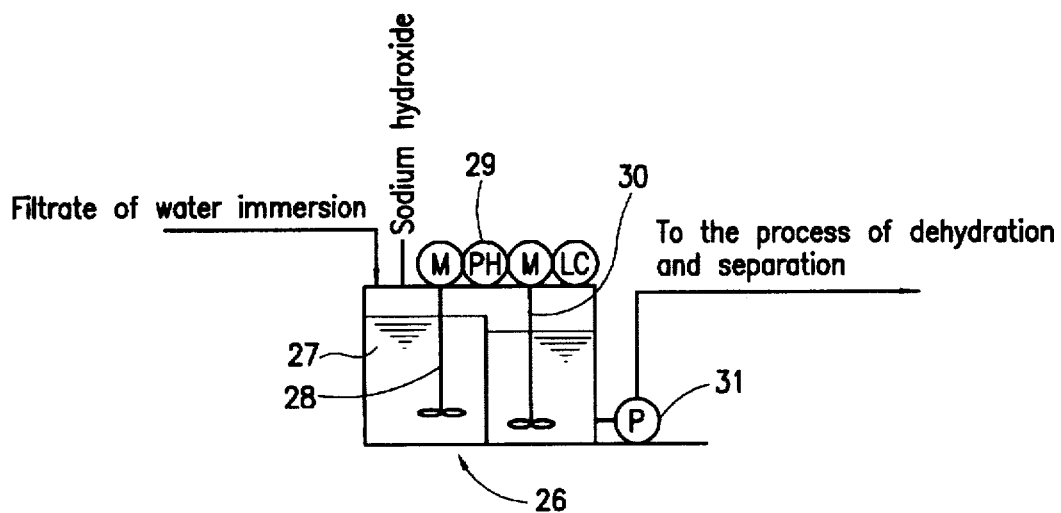
FIG. 4 is a view of equipment depicting a second reaction tank to precipitate tin hydroxide.
Figure 5:
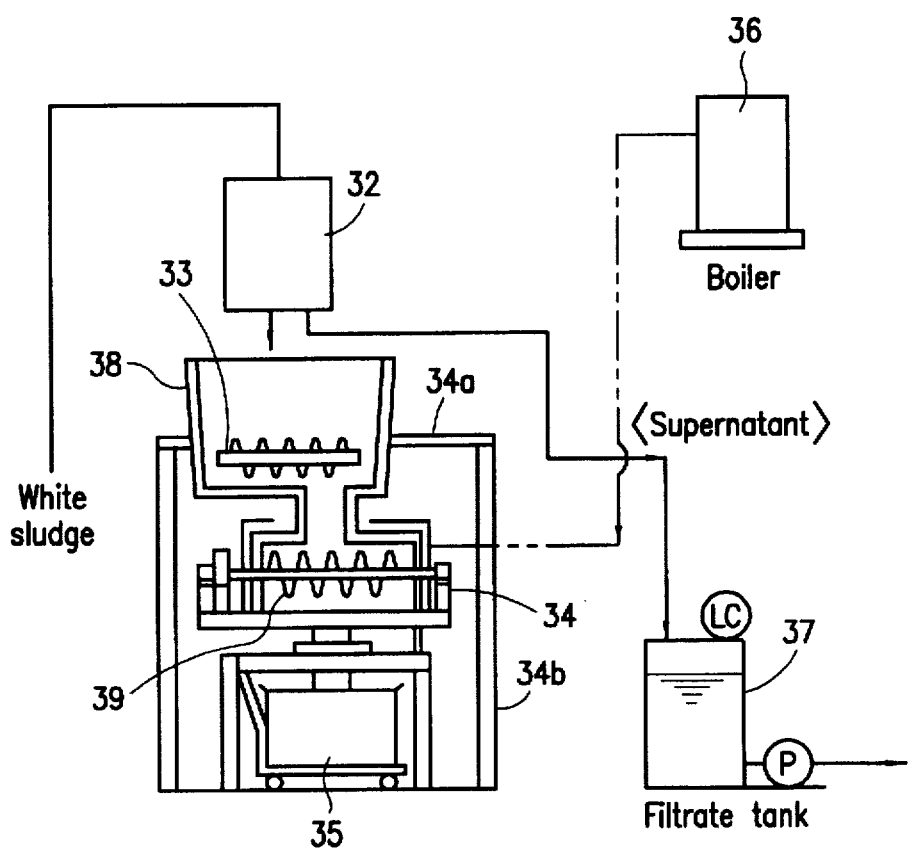
FIG. 5 is a view of equipment depicting a separation means to dehydrate tin hydroxide.
Figure 6:
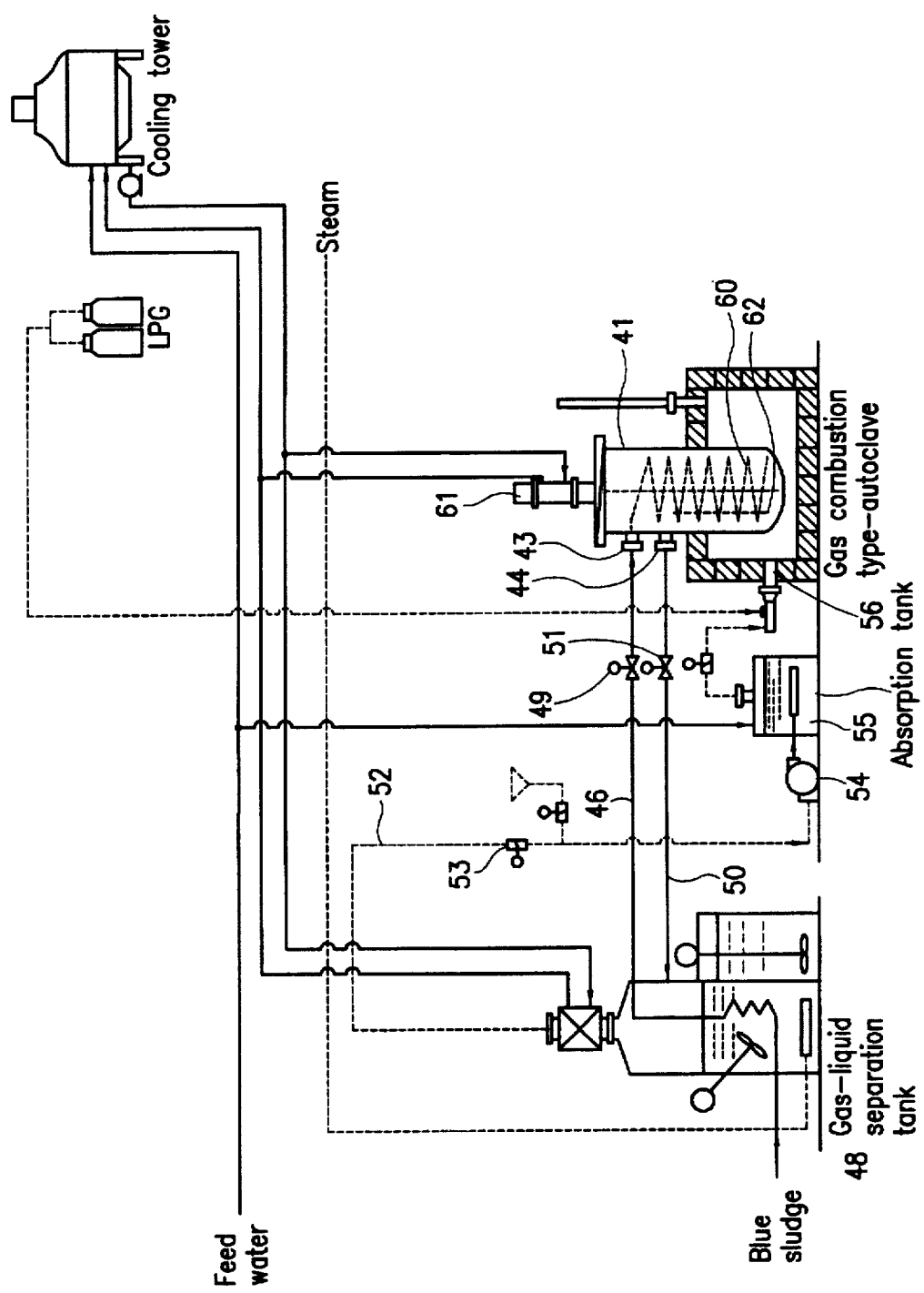
FIG. 6 is a view of equipment depicting an autoclave and a gas-liquid separation tank to be used for alkali hydrolysis.
Figure 7:
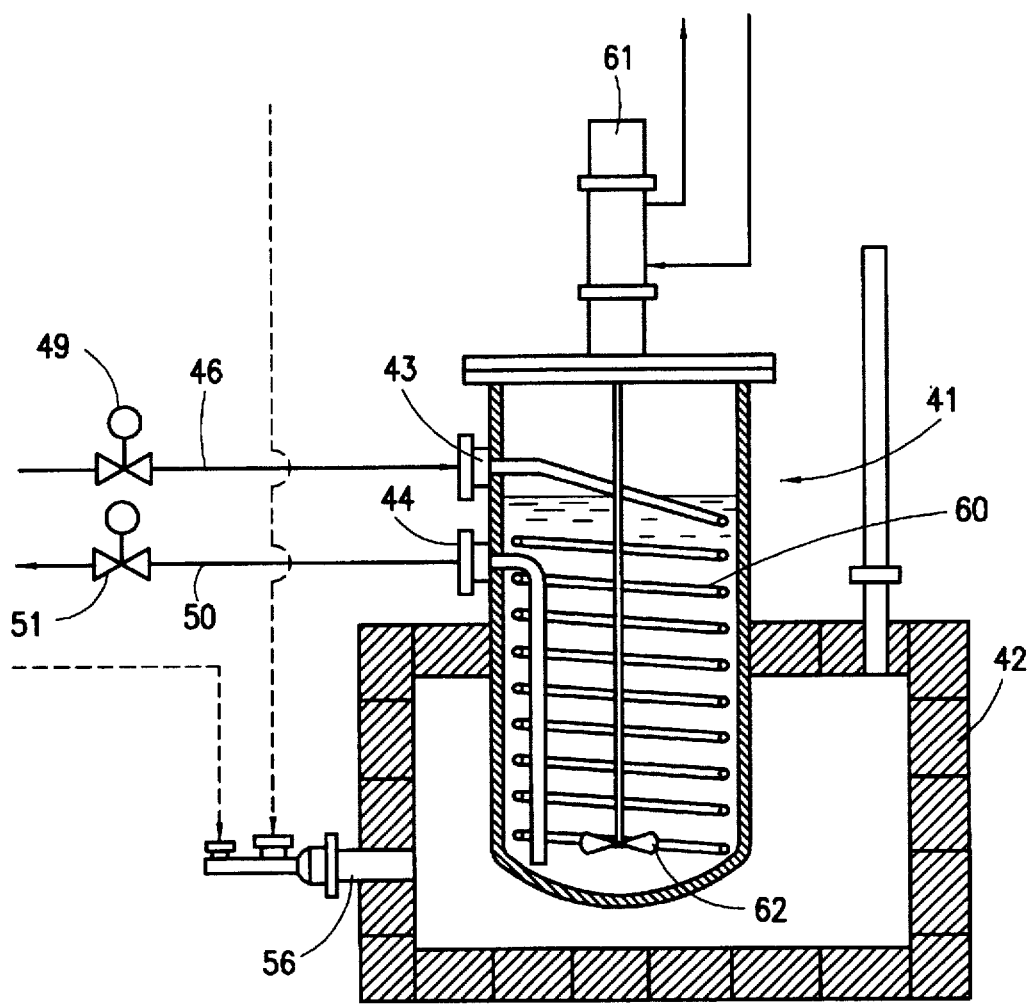
FIG. 7 is a view of equipment depicting the inner structure of the autoclave.
Figure 8:
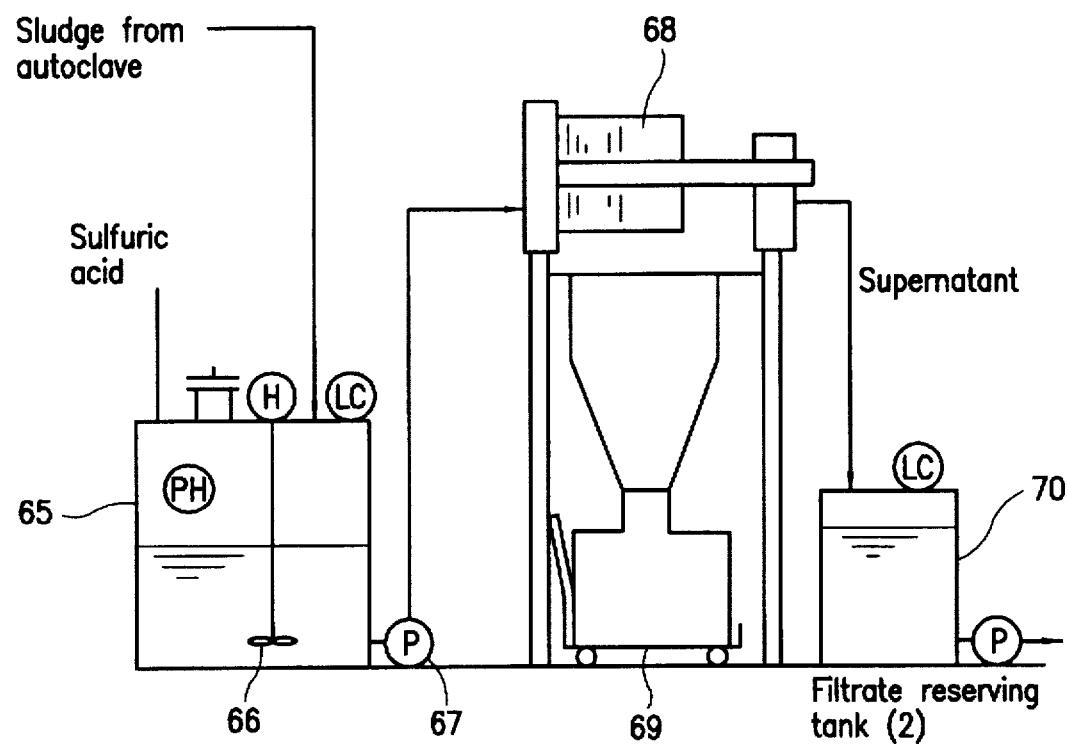
FIG. 8 is a view of equipment depicting a second filter press to dehydrate the sludge generated from the alkali hydrolysis.
Figure 9:
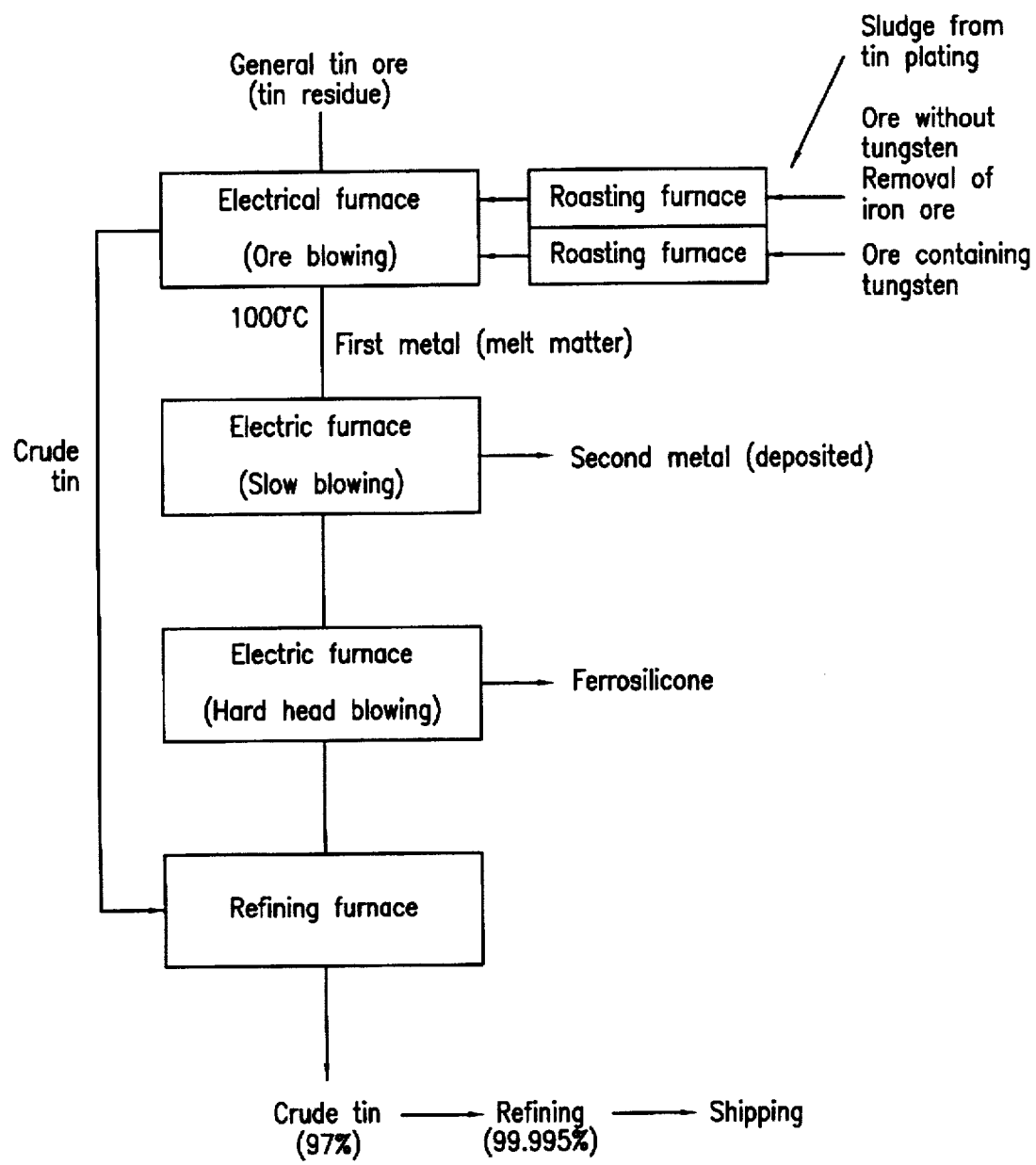
FIG. 9 is a flow chart depicting one example of a conventional dry-type process of treating raw sludge.
Figure 10:
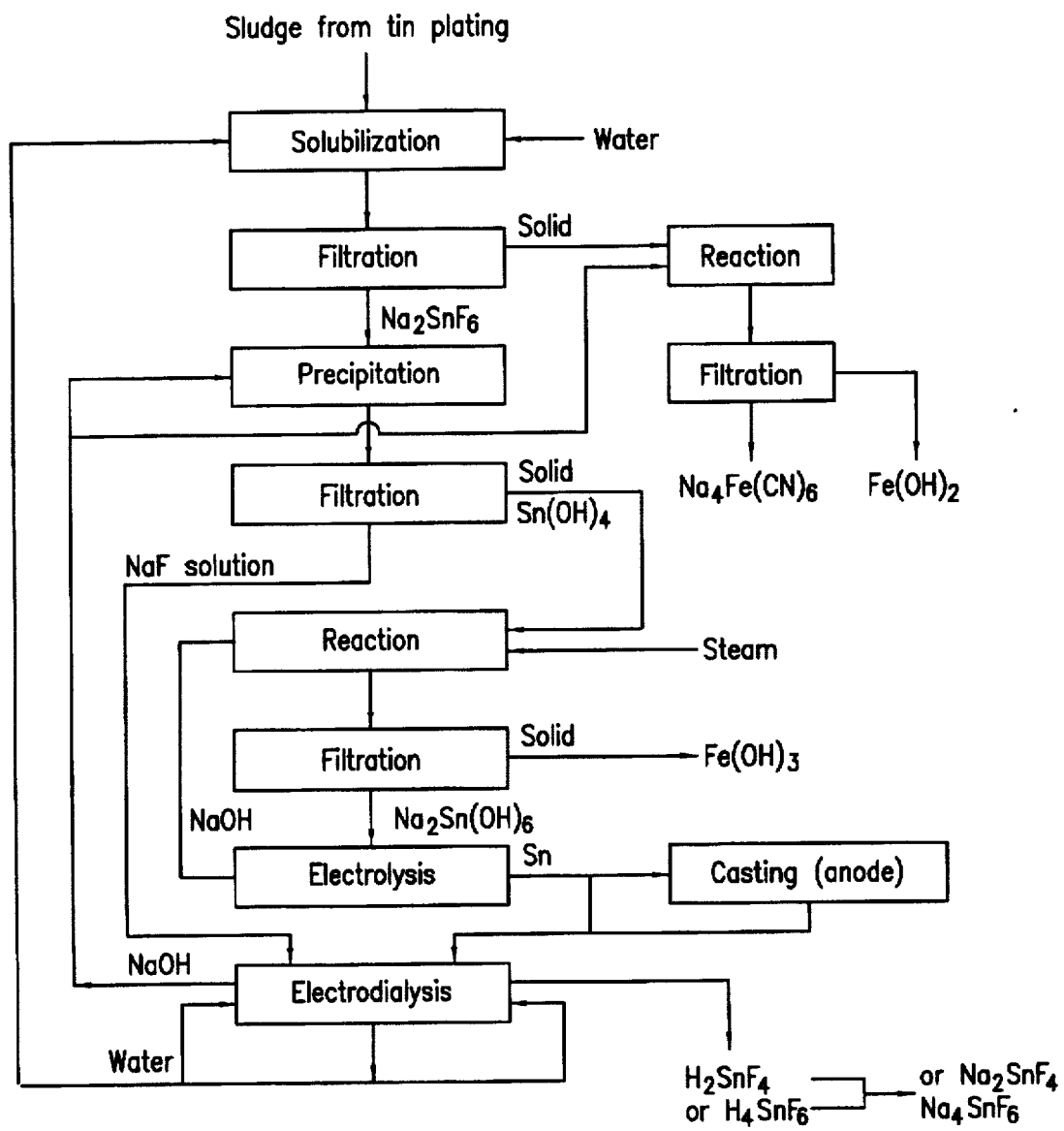
FIG. 10 is a flow chart depicting one example of a conventional wet-type process of treating raw sludge.
Figure 11:
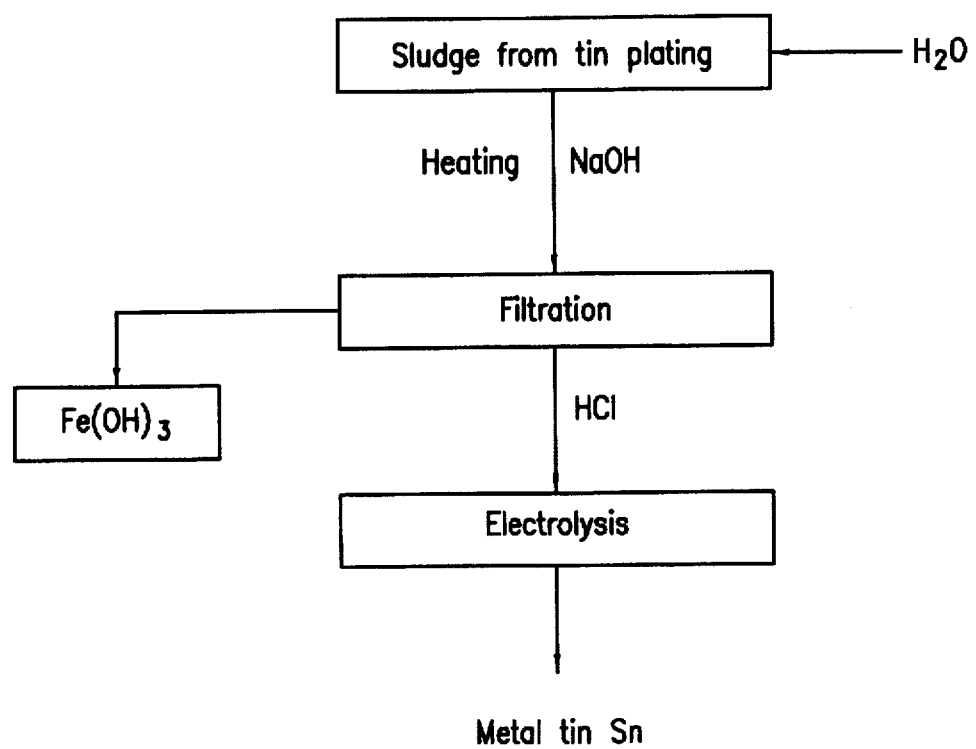
FIG. 11 is a flow chart depicting a method of treating sludge, described in Japanese Patent Laid-open No. Sho 57-70242.

FIG. 1 depicts the overall processes of treating sludge as previously detailed in accordance with the present invention; FIGS. 2 to 8 depict individual means to be used at the processes. More specifically, FIG. 2 is a first reaction tank for carrying out the water immersing process for water immersing raw sludge to transfer the sodium stannic hexafluoride contained therein into the solution, and carrying out if necessary the process of oxidizing iron ions in the solution from divalence to trivalence by means of $H_2O_2$, whereby the iron ions are modified into the form of iron hydroxide (ferric hydroxide) and prepared into sludge; FIG. 3 is a first filter press for separating a solution containing sodium stannic hexafluoride and blue sludge from the water immersing solution; FIG. 4 is a second reaction tank for precipitating tin hydroxide; FIG. 5 is a separating means for carrying out dehydration and drying of tin hydroxide; FIG. 6 depicts an autoclave and a gas-liquid separation tank to be used for alkali hydrolysis; FIG. 7 is a detail of the autoclave; FIG. 8 is a second filter press for carrying out the dehydration of sludge generated by the alkali hydrolysis.

FIGS. 2 to 8 will be successively described below.

In FIG. 2, the numerical figure "1" represents first reaction tank; "2" represents a can containing raw sludge; "3" represents a crane; "5" represents a raw sludge charging device to invert the can 2 downwardly in a slanting direction; "6" represents the lid of the first reaction tank; "7" represents a pump ejecting the solution in the first reaction tank from nozzle 8; "M" represents a motor and "LC" represents a level controller. As shown in the figure, by spraying a high-pressure liquid into the can 2 held downwardly in a slanting direction in the first reaction tank by means of the nozzle 8, raw sludge is dropped down into the first reaction tank, and subsequently, the can 2 is transferred back by means of the crane 3 to the initial position. The raw sludge may be transferred back from the plating line directly to be then directly charged into the first reaction tank.

In FIG. 2, "9" represents an agitating blade; "10" represents raw sludge the form of slurry; "11" represents a steam ejection nozzle; "12" represents a hydrogen peroxide reservoir tank; and "13" represents a pH meter. As described above, the temperature of the raw sludge charged in the first reaction tank is elevated to 40° to 70° C. by steam from the nozzle 11, and is simultaneously diluted to about 10 fold. The raw sludge "10" with addition of $H_2O_2$ and adjusted to pH 4 to 6 is immersed into water under agitation with the agitating blade "9", to solubilize the sodium stannic hexafluoride. The solution solubilizing the sodium stannic hexafluoride mixed with the non-solubilized residues, in the state of slurry, is transferred back from the first reaction tank to the subsequent dehydration and separation process by means of pump 15. To the first reaction tank 1 is transferred back a turbid solution generated at the initial stage of the dehydration and separation process.

In FIG. 3, "20" represents a first filter press; "21" represents a blue sludge tank; "22" represents an agitating blade; "23" represents a cleaning tank for the cleaning water to be used when the alkali hydrolysis system (autoclave) is off; "24" represents a pump; and "25" represents blue sludge. The raw sludge through the immersion process in warm water by means of the system of FIG. 2 is filtered by the filter press 20, while the solid is transferred back to the blue sludge tank 21; alternatively, an initially recovered filtrate in turbid solution is transferred back to the water immersing process (FIG. 2), while the filtrates since the initial stage are transferred back to the white sludge precipitation process described hereinafter. The blue sludge 25 is sufficiently mixed with an aqueous solution of for example calcium chloride and sodium hydroxide or calcium hydroxide in the blue sludge tank 21, and is then adjusted to pH 9.5 or more, and when the resulting mixture solution is held at a sufficient level in the tank, the solution is drawn out of the pump 24 and then flows in the process for alkali hydrolysis.

In FIG. 4, "26" represents a second reaction tank; "27" represents a filtrate from water immersion; "28" and "30" represent agitating blades; "29" represents a pH meter; and "31" represents a pump. To the filtrate recovered from the dehydration and separation is added sodium hydroxide in the second reaction tank 26. The resulting mixture is adjusted to pH of about 7.5 to 10, preferably about 8.5, prior to agitation. Then, tin hydroxide gradually precipitates from the solution. The solution containing the precipitate to some extent flows in "26a", and is transferred into the dehydration and separation process by means of pump 31.

In FIG. 5, "32" represents a separation means for carrying out the dehydration of tin hydroxide (specifically, representing a centrifuge); "33" represents a screw feeder; "34" represents a white sludge dryer; "35" represents a receiving vessel; "36" represents a boiler; and "37" represents a filtrate reservoir. The white sludge dryer 34 is wholly placed in a case covered with removable cover 34a, and uses steam, transferred through a tube passing through case side panel 34b from the boiler 36, as a heat source. The white sludge separated by means of the centrifuge 32 passes through sludge hopper 38 and screw feeder 33 to be fed into the white sludge dryer 34. The white sludge dryer 34 places therein screw mixer 39, wherein the dry white sludge heated to about 130° to 180° C. over steam for drying is further dried under agitation with the screw mixer 39, and is then charged into the receiving vessel 35 by opening the outlet on the bottom after completion of drying. On the other hand, the filtrate discharged from the separation means (centrifuge) 32 is reserved in filtrate reservoir 37, followed by recycling or by disposal of discharged waste. The dried white sludge is transferred to the treatment process for tin recovery.

In FIG. 6, "41" represents an autoclave; "42" represents a gas combustion type-heating furnace; and "48" represents, a gas-liquid separation tank. The lower half part of the autoclave 41 is placed and arranged in an upright position in the gas combustion type-heating furnace 42, to integrate the autoclave 41 and the heating furnace 42 together; at a part of the autoclave 41 outside the heating furnace 42 are arranged liquid supply part 43 of the blue sludge containing solution and outlet 44 of the treated solution. Additionally, the blue sludge containing solution, transferred from the water immersing process shown in FIG. 2, is preliminarily heated in the gas-liquid separation tank 48, then passing through flow adjusting valve 49 to be continuously fed at a constant flow into the autoclave 41.

"44" represents outlet (referred to as "treated slurry outlet 44" hereinbelow) for discharging a slurry mixture (referred to as "treated slurry" hereinafter) of the sludge, gas and liquid generated from the alkali hydrolysis and the fluoride fixing reactions, which is connected through tube 50 with the gas-liquid separation tank 48. Flow adjusting valve 51 is arranged intermediately in the tube 50, to continuously supply the treated slurry in the autoclave 41 to the gas-liquid separation tank 48.

Cyanide in the blue sludge continuously heated and treated in the autoclave 41 under pressure for a given duration, is subjected to alkali hydrolysis and converted into ammonia gas and formate following the formulae (1) and (2) heretofore referred to herein, and sodium fluoride generated according to the reaction formula (3) is modified into calcium fluoride by the reaction formula (4). These are supplied from the treated slurry outlet 44 into the gas-liquid separation tank 48, for use therein as a heat source for preliminarily heating the slurry prior to treatment, namely the blue sludge. The ammonia gas is separated from the liquid in the gas-liquid separation tank 48. Furthermore, compounds from the reaction of the fluoride in the blue sludge with calcium ions are in the form of a mixture with the liquid.

The ammonia gas separated in the gas-liquid separation tank 48 is drawn via the tube 52 out of the upper part of the separation tank 48, and is fed through removable valve 53 and blower 54 into absorption tank 55, wherein the ammonia gas is treated with a sodium hydroxide-treated solution in the absorption tank 55 and is then fed into the burner 56 of the gas combustion type-heating furnace 42, where the ammonia gas is used as a fuel for heating the autoclave 41. Additionally, the treated slurry separated from the ammonia gas in the gas-liquid separation tank 48 and mixed with calcium fluoride, is and transferred to the next process.

So as to successively supply and treat the blue sludge into the autoclave 41, the retention time of the blue sludge should be prolonged in the autoclave 41. Therefore, a spiral passage 60 is arranged, of which one end is communicated with liquid supply part 43 inside the autoclave 41 and the other end is opened in the bottom part of the autoclave 41. The blue sludge, in slurry form, fed from the liquid supply part 43 flows slowly inside the spiral passage 60 for a long period to be sufficiently heated, and is then discharged into the autoclave 41, so that the reaction time required for the alkali hydrolysis of the blue sludge can be sufficiently secured.

Furthermore, agitator 62 for agitating the blue sludge slurry, which is driven to be rotated by motor 61 placed outside, is arranged in the autoclave 41 (also see FIG. 7). It is needless to say that the heating of the blue sludge charged in the autoclave 41 can be carried out by using the gas combustion type-heating furnace 42 in combination with a heater and steam.

Blue sludge of a given amount is charged in the autoclave 41, where the blue sludge is maintained by heating at a temperature for example of 170° C. for a given period of 2 to 3 hours, by burning the gas combustion type-heating furnace 42 under the flow of the combustion gas. On completion of the hydrolysis treatment under agitation at an elevated pressure in the autoclave 41 due to the heating, the blue sludge is successively fed at a preset rate via flow adjusting valve 49 into the autoclave 41.

The supply of the blue sludge into the autoclave 41 should be preset satisfactorily so that the sludge might be retained in the pressure vessel for the duration required for the hydrolysis treatment; the supply can be freely set via the flow adjusting valve 49, and simultaneously, the retention time can be secured in the spiral passage 60. Additionally, a treated solution is continuously drawn out of the slurry outlet 44 into the gas-liquid separation tank 48. The amount to be drawn out should be adjusted by means of the flow adjusting valve 51, so that the amount might be in balance with the supply to the blue sludge.

The ammonia gas separated in the gas-liquid separation tank 48 is fed into the burner 56 of the gas combustion type-heating furnace 42 to be used therein as a heating fuel of the autoclave 41. When the single use of the ammonia gas cannot generate sufficient calories, LPG may be also used in combination. As has been described above, the continuous supply of blue sludge realizes continuous alkali hydrolysis, and by the continuous 24-hour operation, the processability is enhanced by 2 to 3 fold compared with the batch process. Thus, only an equipment of a smaller size should be needed for treating the same amount of sludge as conventionally carried out.

Additionally, the treated solution after the gas liquid separation is to be treated by the second filter press as shown in FIG. 8.

In FIG. 8, "65" represents a pH adjusting tank; "66" represents an agitating blade; "67" represents a pump; "68" represents a second filter press; "69" represents a receiving tank of treated sludge; and "70" represents a filtrate reservoir tank. Because the slurry containing the sludge generated following the formulae (1) to (4) has a too high pH for these individual means, the slurry is neutralized with sulfuric acid, and is then separated into filtrate and solid by means of the second filter press 68. The solid is temporarily reserved in the receiving tank 69 to be disposed of subsequently. Alternatively, the filtrate is once held in the filtrate reservoir tank 70, which is then discharged or is microbiologically treated to be subsequently transferred to other liquid discharge lines.

The present invention will now be described in detail in examples.

By drawing out raw sludge precipitated in the bottom of a haloid plating solution-containing tank arranged in a plating line by means of a transferring pipe, the raw sludge is then treated by the method for treating sludge in accordance with the present invention so as to recover tin and modify the elements under regulations of industrial waste into non-hazardous matters.

The raw sludge was analyzed, and the results are shown below.

T-Sn 19.6%
Fe 5.3%
Na 15.2%
T-CN 1.7%
Cl 1.1%
F 27.1%  $H_2O$ 25.0%
others 5.0%
total sum 100.0%

Herein, 100 kg of the raw sludge was treated following the process chart shown in FIG. 1. In FIG. 1, numerical figures with no unit are expressed in the unit "kg".

Firstly, into the first reaction tank 1 were charged 100 kg of the raw sludge and 1000 kg of water, followed by addition of 11 kg of 25% NaOH and 0.2 kg of 30% $H_2O_2$, and while keeping the temperature of the inside of the tank at about 50° C., water immersion was carried out. The immersing solution was at pH 5.5.

Passing the immersing solution through the first filter press 20, followed by dehydration and filtration (the dehydration and filtration 1 of FIG. 1), the residue was weighed 36.0 kg while the filtrate (1075.2 kg) contained tin in the form of $Na_2SnF_6$. Blue sludge contained $Na_3FeF_6$ (16.7 kg) and $Fe_4[Fe(CN)_6]_3$ (3.1 kg) together with a tin fraction (2.5 kg).

Successively, the filtrate was transferred into the second reaction tank 26, into which was added a 25% aqueous solution of NaOH (99 kg), for pH adjustment to about 8.5, to precipitate tin under agitation. The treated solution containing the precipitate was applied to centrifuge 32, to recover solid (white sludge) of a moisture content of 58%. In the white sludge, the contents of $Sn(OH)_4$ and the metal tin were 27.8 kg and 17.8 kg, respectively. The filtrate after separating the white sludge weighed 1093 kg, containing NaF of 3.2% and the metal tin of about 200 ppm. The filtrate was transferred back into the plating bath containing haloid ions to be applied to the preparation of the components of the plating bath containing haloid ions.

After drying the separated precipitate containing tin hydroxide to be prepared into tin oxide, the tin oxide is placed in a ladle. By passing direct current between a graphite anode and a cathode, the precipitate containing tin oxide was heated and melt as a resistor. Then, the tin oxide was reduced with graphite powder added independently. The metal tin thus recovered was at a purity of 99.9%.

By charging the blue sludge (36.0 kg; moisture content of about 38%), $CaCl_2$ (28 kg), water (240 kg) and 25% NaOH (35.4 kg) into the blue sludge tank 21 and sufficiently mixing them together therein, the mixture solution was adjusted to pH 12. The blue sludge mixture solution (339.4 kg) was continuously transferred into the autoclave 41, for thermal hydrolysis under the conditions of 210° C. and 19 kg/cm². After the reaction, the ammonia gas (1.4 Nm³) separated in the gas-liquid separation tank was introduced into the heating combustion furnace 42 to be burned at 800° C. at which no NOx is to be generated. The ammonia concentration in the combustion gas waste was 50 ppm or less. Also, the hot water (1000 kg) heated by the combustion gas waste was transferred back to the first reaction tank 1, where the water was mixed with the raw sludge.

By the thermal hydrolysis in the autoclave 41, the resulting treated solution and precipitate were dehydrated and filtered with the second filter press 68. The separated residue (treated sludge) was weighed 52.6 kg. The composition thereof is as follows;
$Fe_3O_4$ 1.7 kg
FeO 0.2 kg
$H_2O$ 26.3 kg
$CaF_2$ 16.4 kg
$Fe_2O_3$ 5.5 kg
others 2.5 kg.

Then, the filtrate was analyzed. The results are shown below.
Total-CN<1.0 ppm
Total-Sn<1.0 ppm
Total-F<10 ppm.

The analytical values listed above indicate that the cyanide in the plating solution was nearly completely decomposed and that the fluoride in the plating solution was fixed as $CaF_2$. Furthermore, the COD due to the formate in the filtrate was 400 ppm.

The processes are embodied in the examples described above; it is evident in the examples that the quality of the iron in the metal tin recovered by using the oxidants at the water immersing process can further be enhanced. It is also apparently shown that tin recovery from the water immersing solution may be carried out singly by using an oxidant, without thermal hydrolysis.

What is claimed is:

1. In a method for treating sludge comprising sodium stannic hexafluoride, sodium ferric hexafluoride and ferric ferrocyanide, said sludge being a by-product of a process of tin electroplating of steel plate by means of a plating bath containing cyanides and haloid ions, the steps which comprise immersing and mixing said sludge into an aqueous bath having a pH of 7 or less to form a slurry, physically separating the remaining solids which comprise sodium ferric hexafluoride and ferric ferrocyanide from the slurry to form a separated solution and residual solids, and subjecting said residual solids from said separation step to alkali hydrolysis within a temperature range of 100° to 400° C. to convert halide ions and cyanides to compounds comprising insoluble halides and at least one formate.

2. A method for treating sludge according to claim 1, wherein ions of an alkali earth metal are added before, during or after the step of alkali hydrolysis.

3. A method for treating sludge according to claim 2, wherein said ions of an alkali earth metal are at least one selected from the group consisting of calcium ion and magnesium ion.

4. A method for treating sludge according to claim 2, wherein said ions of an alkali earth metal are generated from at least one compound selected from the group consisting of calcium chloride, calcium oxide, calcium carbonate, calcium hydroxide, magnesium chloride, magnesium oxide, magnesium carbonate and magnesium hydroxide.

5. A method for treating sludge according to claim 1 or 2, comprising introducing said residual solids into a solution of pH 9.5 or more and subjecting said solution to said alkali hydrolysis.

6. A method for treating sludge according to claim 1 or 2, wherein an oxidant is present in said aqueous both of said immersion step.

7. A method for treating sludge according to claim 6, wherein said oxidant is aqueous hydrogen peroxide.

8. A method for treating sludge, comprising the step of immersing and mixing into water at pH 5.5 to 6 sludge produced as a by-product of a process of tin electroplating a steel plate by means of a plating bath containing cyanides and haloid ions to form a slurry, said sludge comprising sodium stannic hexafluoride, sodium ferric hexafluoride and ferric ferrocyanide, first physically separating the remaining solids which comprise sodium ferric hexafluoride and ferric ferrocyanide from the slurry to form a separated solution and residual solids, subjecting the residual solids from said first separation step to alkali hydrolysis within a temperature range of 100° to 400° C., to convert cyanides to compounds comprising at least one formate, adjusting the separated solution from said first separation step to pH 71.5 to 10 to precipitate combined tin therefrom, and second physically separating the resulting precipitate principally containing combined tin to form a second separated solution and separated precipitate.

9. A method for treating sludge according to claim 8, wherein ions of an alkali earth metal are added before, during or after the step of alkali hydrolysis.

10. A method for treating sludge according to claim 9, wherein said ions of an alkali earth metal are at least one selected from the group consisting of calcium ion and magnesium ion.

11. A method for treating sludge according to claim 9, wherein said ions of said alkali earth metal are generated from at least one compound selected from the group consisting of calcium chloride, calcium oxide, calcium carbonate, calcium hydroxide, magnesium chloride, magnesium oxide, magnesium carbonate and magnesium hydroxide.

12. A method for treating sludge according to claim 8 or 9, comprising preparing the residual solids into a solution of pH 9.5 or more and subjecting the solution containing said residual solids to said alkali hydrolysis.

13. A method for treating sludge according to claim 8 or 9, comprising the step of dehydrating the precipitate from the second separation to form a precipitate containing tin oxide, and the step of reducing said tin oxide into the metal tin.

14. A method for treating sludge according to claim 8 or 9, comprising concentrating said second separated solution resulting from the combined tin precipitation separation and transferring the concentrated second separated solution resulting from the combined tin precipitation separation back into said plating bath containing haloid ions.

15. A method for treating sludge according to claim 8 or 9, wherein an oxidant is added to at least one of said water of said immersing step and said separated solution from said first separation step.

16. A method for treating sludge according to claim 15, wherein said oxidant is aqueous hydrogen peroxide.

17. A method for treating sludge, comprising the step of immersing and mixing into acidic water a raw sludge produced as a by-product of a process of tin electroplating a steel plate by means of a plating bath containing cyanides and haloid ions to form a slurry, said raw sludge comprising sodium stannic hexafluoride, sodium ferric hexafluoride and ferric ferrocyanide, first physically separating the remaining solids which comprise sodium ferric hexafluoride and ferric ferrocyanide from the slurry to form a separated solution and residual solids, adjusting the separated solution from said first separation step to pH 7.5 to 10 to form a precipitate principally containing tin hydroxide, and secondly physically separating said precipitate to form a second separated solution and a separated precipitate, wherein an oxidant is added to either the slurry of the immersing step or said separated solution, or both, and wherein the slurry of said immersing step is adjusted to pH 5.5 to 6.

18. A method for treating sludge according to claim 17, wherein said oxidant is aqueous hydrogen peroxide.

19. A method for treating sludge according to claim 17 or 18, comprising a step of dehydrating the precipitate principally containing tin hydroxide from the second separation to form tin oxide and a step of reducing the tin oxide recovered from the dehydration into the metal tin.

20. A method for treating sludge according to claim 17 or 18, comprising concentrating said second separated solution and subsequently transferring the concentrated second separated solution back into said plating bath containing haloid ions.

* * * * *

UNITED STATES PATENT AND TRADEMARK OFFICE
CERTIFICATE OF CORRECTION

PATENT NO. : 5,766,440
DATED : June 16, 1998
INVENTOR(S) : Ino, et al

It is certified that error appears in the above-indentified patent and that said Letters Patent is hereby corrected as shown below:

In column 1, line 12, please change "matters" to --matter--; and line 47, please change "$Fe^{2+}$" to --$Fe^{3+}$--.

In column 2, line 54, please change "the compounds, so that" to --compounds, so that the--.

In column 3, line 1, please delete "tin".

In column 6, line 59, please delete "the metal".

In column 9, line 6, please insert --temporarily-- before "present".

In column 11, line 26, please change "provided" to --produced--.

In column 15, line 63, please insert --in-- after "sludge".

In column 17, line 44, please change "and" to --to be--.

In column 20, line 41, please change "both" to --bath--; and line 58, please change "71.5" to --7.5--.

Signed and Sealed this

Twenty-fourth Day of November, 1998

Attest:

BRUCE LEHMAN

Attesting Officer

Commissioner of Patents and Trademarks